Figure 1:
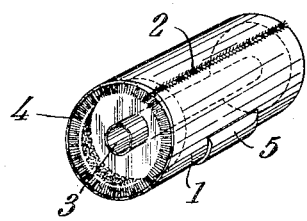

Feb. 14, 1933.  K. HIPKE  1,897,429

PROTECTING FILM ROLL FROM THE ENTRY OF LIGHT

Filed July 16, 1931

Inventor:
Kurt Hipke,
By Attorney
Philip S. Hopkins.

Patented Feb. 14, 1933

1,897,429

UNITED STATES PATENT OFFICE

KURT HIPKE, OF DESSAU IN ANHALT, GERMANY, ASSIGNOR TO AGFA ANSCO CORPORATION, OF BINGHAMTON, NEW YORK, A CORPORATION OF NEW YORK

PROTECTING FILM ROLL FROM THE ENTRY OF LIGHT

Application filed July 16, 1931, Serial No. 551,225, and in Germany July 23, 1930.

The present invention relates to a new device for protecting film rolls wound on spools from the entry of light.

The known film rolls which may be loaded in daylight consist of a spool, having flanges at both ends, on which a photographic film strip is wound together with a protective paper strip in such a manner that the outermost coils of the roll are exclusively formed by the paper. By the flanges of the spool and the windings of the protective paper strip the light sensitive layer is, with this mode of winding the film, protected from the entry of light. Experience has shown, however, that under certain circumstances, for instance, if the flanges of the spool are not exactly parallel to each other or if a pressure is exercized on the film roll, light can penetrate laterally into the space left between the flanges and the edges of the protective paper strip, thus fogging the layer.

According to this invention the film roll is completely protected from the entry of light by means of an elastic metal casing, being open at both sides and having a longitudinal slit extending from one end to the other. The inner surface of this metal casing is lined with velvet or similar material. The length of the casing corresponds approximately to that of the spool of the film roll, its inner diameter being equal to the diameter of the flanges of the spool. During use the casing is fitted over the film roll in such a way that the edges of the two flanges are covered by it. The outer end of the film strip or of the guide paper strip, which is attached to the film strip, is led outwards through the slit in the casing. As the casing remains on the spool bearing the photographic film also in the photographic apparatus, and as the empty spool on which the exposed film is wound is likewise inserted in such a casing which need not be removed until the film is developed in the dark room, any fogging of the margins of the light sensitive film strip is rendered impossible.

By the casing according to this invention photographic as well as cinematographic film rolls can be protected from light. The hitherto necessary protective paper strip can now be dispensed with. Furthermore the casing may be utilized with the film rolls for apparatus of the type known under the trade mark Memo camera or Leica camera, with the aid of which pictures are taken on cinematographic film bands. In this case the new device permits of dispensing with special film holders which are otherwise necessary. If in this type of apparatus the spool on which the exposed film is wound up, is likewise provided with a casing of the type described above, the burdensome rewinding of the film band on the primary spool may likewise be dispensed with. The outer form of the light tight casing must be adapted to the form of the holders generally used, whereas the inner space of the casing suits with the diameter of the particular film roll in question.

In general the light tight casing is made from sheet metal, but may be made, if desired, from any other suitable material, for instance caoutchouc, cellulose derivatives, artificial resin or the like.

The invention is illustrated by the accompanying drawing in which

Figure 2:
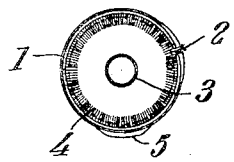
Figure 3:
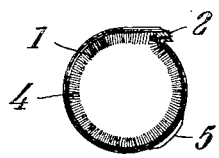
Figure 4:
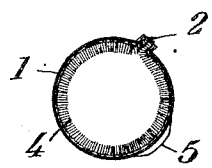

Figure 1 is a perspective view of a casing in which a film spool is inserted and Figures 2, 3 and 4 illustrate different kinds of the casing in cross section; the same reference characters being used to indicate the same parts.

In these figures 1 is an elastic sheet metal case open at both ends and provided with a slit 2 through which the film band is guided which is wound up on the spool 3. The case 1 and the slit 2 are lined with a strip of velvet 4 which effects a light-tight closure with the flanges of the spool, while allowing a frictionless turning of the latter. 5 indicates a nose or similar stopping means which avoids turning of the case 1 in the apparatus. The light tightness at the flanges of the spool is effected by slightly impressing the edges of the flanges into the elastic velvet. Inasmuch as only the flanges of the spool are in intimate contact with the velvet no friction worth mentioning occurs.

What I claim is:

1. A device for protecting film rolls wound on spools provided with flanges from the entry of light comprising a cylindrical open sided casing made of an elastic material and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool so that the flanges of the spool inserted in the casing ensure with the velvet light-tight closure.

2. A device for protecting film rolls wound on spools provided with flanges from the entry of light comprising a cylindrical open sided casing made of sheet metal and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool so that the flanges of the spool inserted in the casing ensure with the velvet a light-tight closure.

In testimony whereof I affix my signature.

KURT HIPKE.